United States Patent
Werjefelt

(10) Patent No.: US 6,460,804 B2
(45) Date of Patent: Oct. 8, 2002

(54) EMERGENCY VISION APPARATUS

(76) Inventor: Bertil R. L. Werjefelt, P.O. Box 5011, Kaneohe, HI (US) 96744

( * ) Notice: Subject to any disclaimer, the term of this patent is extended or adjusted under 35 U.S.C. 154(b) by 0 days.

(21) Appl. No.: 09/769,754

(22) Filed: Jan. 26, 2001

(65) Prior Publication Data

US 2001/0045493 A1 Nov. 29, 2001

Related U.S. Application Data

(60) Provisional application No. 60/178,312, filed on Jan. 27, 2000.

(51) Int. Cl.[7] ................. B64D 11/00; B64D 13/00; H04J 10/00; G02B 23/00; G02B 7/00
(52) U.S. Cl. ................. 244/118.5; 359/141; 359/406; 359/886; 359/895; 359/896; 359/894; 280/738; 280/737; 280/728.1
(58) Field of Search ................. 244/118.5, 118.6; 359/141, 406, 886, 895, 896, 894; 280/738, 737, 728.1

(56) References Cited

U.S. PATENT DOCUMENTS

| | | | | | |
|---|---|---|---|---|---|
| 2,051,730 A | * | 8/1936 | McCandless | ........... | 128/204.18 |
| 2,795,165 A | * | 6/1957 | Vernier | ........... | 395/895 |
| 3,619,042 A | * | 11/1971 | Lazar | ........... | 395/895 |
| 3,768,467 A | * | 10/1973 | Jennings | ........... | 128/145 R |
| 4,154,237 A | * | 5/1979 | Courter | ........... | 128/203 |
| 4,559,939 A | | 12/1985 | Levine et al. | | |
| 4,683,880 A | * | 8/1987 | Werjefelt | ........... | 128/201.29 |
| 4,711,411 A | * | 12/1987 | Copp | ........... | 244/1 R |
| 4,832,287 A | * | 5/1989 | Werjefelt | ........... | 244/118.5 |
| 4,909,247 A | * | 3/1990 | Terrisse et al. | ........... | 128/206.27 |
| 4,928,348 A | * | 5/1990 | Clayton | ........... | 15/345 |
| 4,960,119 A | * | 10/1990 | Hamlin | ........... | 128/204.18 |
| 5,078,343 A | * | 1/1992 | Howlett | ........... | 244/118.5 |
| 5,165,625 A | * | 11/1992 | Gutman | ........... | 244/118.5 |
| 5,202,796 A | | 4/1993 | Werjefelt | | |
| 5,318,250 A | * | 6/1994 | Werjefelt | ........... | 244/118.5 |
| 5,491,589 A | * | 2/1996 | Haymond | ........... | 359/895 |
| 5,947,415 A | * | 9/1999 | Werjefelt | ........... | 244/118.5 |
| 6,023,382 A | * | 2/2000 | Hollingsworth et al. | ........... | 359/895 |
| 6,082,673 A | * | 7/2000 | Werjefelt | ........... | 244/118.5 |
| 6,191,899 B1 | * | 2/2001 | Fuchs | ........... | 359/894 |
| 6,315,512 B1 | * | 11/2001 | Tabrizi et al. | ........... | 414/217 |

* cited by examiner

Primary Examiner—Charles T. Jordan
Assistant Examiner—Stephen A. Holzen
(74) Attorney, Agent, or Firm—Shlesinger, Arkwright & Garvey LLP

(57) ABSTRACT

An emergency supplementary vision device comprises a collapsible tube made of airtight material and having an expanded form and a compact stowed form; first and second clear members disposed at respective first and second ends of the tube to enable the user to see through said tube and observe a source of information at the other end while smoke or other particulate matter is in the environment; and a filter operably associated with the tube to filter the ambient atmosphere and fill the interior of said tube with clear air when said tube is expanded to its expanded form.

33 Claims, 1 Drawing Sheet

EMERGENCY VISION APPARATUS

RELATED APPLICATION

This is a nonprovisional application which claims the priority benefit of provisional application Serial No. 60/178,312 filed Jan. 27, 2000, which is hereby incorporated by reference.

FIELD OF THE INVENTION

The present invention relates generally to an apparatus to enable an operator to maintain visual contact with instruments or other visual sources of data after smoke and/or particulate from a fire or other sources has invaded the operator's environment. In particular, the present relates to an automatically expandable enclosure that bridges the gap between the pilot and the windshield and/or instrument panel along the pilot's line of sight and provides a clear viewing path to the windshield and/or the instrument panel, thereby providing him with vital information for guiding the aircraft to a safe landing after smoke and/or particulate matter invades the cockpit area.

BACKGROUND OF THE INVENTION

Emergency vision devices for aiding pilots to see through vision-impairing smoke to maintain their visual access to critical information, such as that provided by an instrument panel and visual information available outside the cockpit to help pilots safely guide their aircrafts are disclosed in U.S. Pat. Nos. 4,832,287; 5,318,250; 5,202,798; and 5,947,415, all issued to Bertil Werjefelt.

The devices disclosed in the above-cited patents provide the primary means for providing an operator clear visibility to the instruments or sources of data during emergency smoke conditions. Generally, these devices require a pump or source of pressurized gas to inflate and deploy the devices. Some of the devices are generally designed for specific cockpit configurations so that once they are deployed, they are not typically movable around the cockpit. Consequently, the operator may not be able to view other sources of data which the operator may need to see but is not in the line of sight provided by the devices.

Accordingly, there is a need for a supplementary emergency vision device that is self inflating and readily portable to assist the pilot through the various procedures and checklists to operate the aircraft under emergency smoke conditions.

OBJECTS AND SUMMARY OF THE INVENTION

It is an object of the present invention to provide an emergency supplementary vision device that is relatively compact and easily fits within a brief case.

It is another object of the present invention to provide an emergency supplementary vision device that is portable and easily handled by the operator to assist him in various procedures and checklists required to operate an aircraft while under emergency smoke conditions.

It is still another object of the present invention to provide an emergency supplementary vision device that is self-inflating without using power consuming pumps or pressurized gas.

In summary, the present invention provides an emergency supplementary vision device comprising a collapsible tube having an expanded form and a compact stowed form; a flexible support, such as a spring, operably secured to the tube, biased to expand the tube to its expanded form and adapted to be collapsible when the tube is collapsed to its compact stowed form; first and second clear members disposed at respective first and second ends of the tube to enable the user to see through the tube and observe a source of information at the other end while smoke or other particulate matter is in the environment; and a filter operably associated with the tube to filter the ambient atmosphere and fill the interior of tube with clear air when the tube is expanded to its expanded form. A source of light may be provided to aid the user to see the source of information.

These and other objects of the invention will be apparent from the following detailed description.

BRIEF DESCRIPTIONS OF THE DRAWINGS

DETAILED DESCRIPTION OF THE INVENTION

Figure 1:
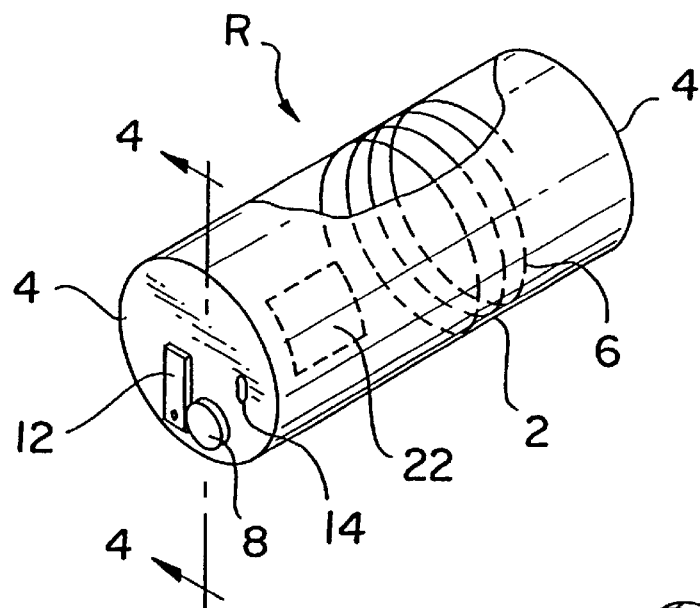
FIG. 1 is a perspective view of an emergency vision device, shown in its deployed inflated form.

An emergency vision device R made in accordance with the present invention is disclosed in FIG. 1. The device is in the form of a collapsible tube 2 made from an airtight fabric or other suitable materials. Tube 2 is closed off at each end. A transparent member 4, such as clear plastic sheet, is provided at each end to allow the user to see through the tube. A helical spring 6 is disposed within the tube 2 to bias the two members 4 away from each other and expand the tube 2 from its deflated compressed form to its deployed inflated form. The spring 6 may also be disposed outside the tube. The spring 6 can be of any suitable geometric shape. The spring 6 advantageously provides support and rigidity to the tube to prevent its collapse during use while being handled. The spring 6 is only partially shown for clarity. It should be understood that the spring stretches from one end of the tube to the other end and under compression to maintain the tube in the expanded form. A filter 8 is disposed at one end of the tube to allow ambient air to fill the volume of the tube as it expands under the action of the spring 6 after being taken out of its pouch 10. The filter 8 is designed to filter the ambient air during an emergency smoke situation and provide clear air to fill the volume of the tube 2. The filter 8 is preferably a HEPA filter. A light source 12 with its own battery power and switch may be provided at one end of the tube 2. The switch may provide for automatic activation of the light 12 when the device R is pulled out of its pouch 10. The switch may also be operated manually to conserve power.

Figure 5:
FIG. 5 is a schematic circuit for automatic activation of a light.

Automatic activation of the light may be accomplished in many ways. One example would be to provide two switches 16 and 18 in series with the light 20, where switch 16 is depressed to an open state by the confining wall of the pouch 10 and other switch 18 is normally on, as best shown in FIG. 5. When device R is taken out of the pouch, the switch 16 will go into a closed state, causing the light 20 to be energized, since the other series switch 18 is already in the on state.

When the device R is not used, it is stowed within the pouch 10, which is designed to hold the spring 6 in the compressed position.

Figure 2:
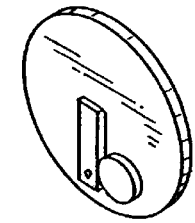
FIG. 2 is a perspective view of the device shown in FIG. 1 in a compressed stowed form.
Figure 3:
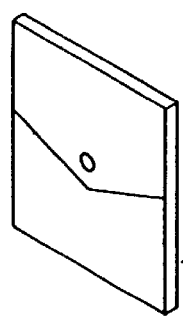
FIG. 3 is a perspective view of a pouch for storing the compressed device shown in FIG. 2.
Figure 4:
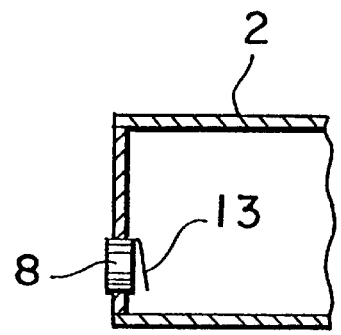
FIG. 4 is a cross-sectional view across taken along line 4—4 of FIG. 1.

When not in use, the device R is compressed to a compact form, as shown in FIG. 2, and is placed within the pouch 10. To deploy the device R, it is pulled out of the pouch 10, allowing the spring 6 to expand and inflate the tube 2, without use of powered pumps or compressed gas. Ambient air is filtered through the filter 8 and fills up the space within the tube 2. The light 12, which may be automatically activated, provides illumination on the object requiring visual visibility to the operator.

Although the tube 2 is shown with a circular cross-section, it should be understood that any cross-sectional shape would be applicable as long as a clear visibility path is provided through the tube.

In another embodiment, the spring 6 may be omitted. The ends 4 could be pulled apart from each other to deploy and expand the tube, drawing air into the interior. A movable flap 13 inside the tube is disposed across the filter so that air can flow into the tube through the filter but not flow out so that air is trapped inside. When the tube fills up with air, the flap 13 prevents the air from escaping to provide the tube with form and prevent it from collapsing when handled. A one-way valve with the direction of flow into the tube, and connected in series with the filter 8 can also be used in place of the flap 13. Although the flap 13 is shown secured to the filter, it should be understood that it can be installed in any other standard manner, as long as it is operative to prevent the backflow of air from inside the tube. A closable port or opening 14 is provided to allow the air inside the tube to be exhausted when the tube is deflated for stowage.

The filter 8 may also be integrated into the wall of the tube 2 in various ways. For example, a portion 22 or the entire tube wall may be made of filter material.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. An emergency supplementary vision device, comprising:
   a) a collapsible tube made of airtight material and having an expanded form and a compact stowed form;
   b) first and second clear members disposed at respective first and second ends of said tube to enable the user to see through said tube and observe a source of information at the other end while smoke or other particulate matter is in the environment;
   c) a filter operably associated with said tube to filter the ambient atmosphere and fill the interior of said tube with clear air when said tube is expanded to its expanded form; and
   d) a flexible support operably secured to the tube, extending from one end of said tube to the other end, adapted to expand said tube to its expanded form and thereby to draw ambient air through said filter into said tube, and said flexible support being adapted to be collapsible when said tube is collapsed to its compact stowed form.

2. An emergency supplementary vision device as in claim 1, wherein said flexible support is biased to expand said tube to its expanded form.

3. An emergency supplementary vision device as in claim 1, and further comprising:
   a) a one-way valve operably disposed in series with said filter; and
   b) said valve is normally open in one direction to allow air into said tube and normally closed in an opposite direction to maintain the air inside said tube.

4. An emergency supplementary vision device as in claim 1, and further comprising a closable port operably associated with said tube to allow air within said tube to be exhausted out when said tube is compacted down to said stowage form.

5. An emergency supplementary vision device as in claim 1, and further comprising:
   a) a source of light to aid the user to see the source of information; and
   b) a switch to control said source of light.

6. An emergency supplementary vision device as in claim 5, wherein said switch is disposed at one end of said tube.

7. An emergency supplementary vision device as in claim 5, and further comprising:
   a) a pouch for storing said tube in the compact stowed form; and
   b) means for automatically activating said switch when said tube is pulled out of said pouch.

8. An emergency supplementary vision device as in claim 5, and further comprising:
   a) a pouch for storing said tube in the compact stowed form; and
   b) first and second switches disposed in series with said light source;
   c) said first switch is in off state when inside said pouch and in an on state when outside said pouch; and
   d) said second switch is in an on state inside or outside said pouch.

9. An emergency supplementary vision device as in claim 2, wherein said flexible support includes a spring.

10. An emergency supplementary vision device as in claim 2, wherein said flexible support is a helical spring.

11. An emergency supplementary vision device as in claim 9, wherein said spring is disposed within said tube.

12. An emergency supplementary vision device as in claim 1, wherein said tube is cylindrical.

13. An emergency supplementary vision device as in claim 1, wherein said tube is an airtight fabric.

14. An emergency supplementary vision device as in claim 1, wherein said clear members are plastic.

15. An emergency supplementary vision device as in claim 1, wherein said filter is disposed at one end of said tube.

16. An emergency supplementary vision device as in claim 1, wherein said filter is integrated with said tube.

17. An emergency supplementary vision device as in claim 16, wherein a portion of said tube is made of filter material.

18. An emergency supplementary vision device as in claim 1, wherein said filter is a HEPA filter.

19. An emergency supplementary vision device, comprising:
   a) a collapsible tube made of airtight material having an expanded form and a compact stowed form, said tube being adapted to draw in ambient air when it is manually expanded;
   b) first and second clear members disposed at respective first and second ends of said tube to enable the user to see through said tube and observe a source of information at the other end while smoke or other particulate matter is in the environment;

c) a filter operably associated with said tube to filter the ambient air drawn into said tube when said tube is expanded; and d) a one-way valve operably disposed in series with said filter, said valve is normally open in one direction to allow air into said tube and normally closed in an opposite direction to maintain the air inside said tube.

20. An emergency supplementary vision device as in claim 19, and further comprising a closable port operably associated with said tube to allow air within said tube to be exhausted out when said tube is compacted down to said stowage form.

21. An emergency supplementary vision device as in claim 19, wherein said valve includes a flap disposed across said filter within said tube.

22. An emergency supplementary vision device as in claim 19, wherein said filter is a HEPA filter.

23. An emergency supplementary vision device as in claim 19, wherein said tube is an airtight fabric.

24. An emergency supplementary vision device as in claim 19, wherein said clear members are plastic.

25. An emergency supplementary vision device as in claim 19, wherein said filter is disposed at one end of said tube.

26. An emergency supplementary vision device as in claim 19, wherein said filter is integrated with said tube.

27. An emergency supplementary vision device as in claim 19, wherein said tube is made of filter material.

28. An emergency supplementary vision device as in claim 19, wherein said filter is a HEPA filter.

29. An emergency supplementary vision device, comprising:

a) a collapsible tube made of an airtight material and having an expanded form and a compact stowed form, said tube including a portion made of filter material to filter the ambient atmosphere and fill the interior of said tube with clear air when said tube is expanded to its expanded form;

b) a flexible support operably secured to said tube, biased to expand said tube to its expanded form and adapted to be collapsible when said tube is collapsed to its compact stowed form; and c) first and second clear members disposed at respective first and second ends of said tube to enable the user to see through said tube and observe a source of information at the other end while smoke or other particulate matter is in the environment.

30. An emergency supplementary vision device, comprising:

a) a collapsible tube made of airtight material and having an expanded form and a compact stowed form;

b) first and second clear members disposed at respective first and second ends of said tube to enable the user to see through said tube and observe a source of information at the other end while smoke or other particulate matter is in the environment;

c) a filter operably associated with said tube to filter the ambient atmosphere and fill the interior of said tube with clear air when said tube is expanded to its expanded form;

d) a source of light to aid the user to see the source of information;

e) a switch to control said source of light;

f) a pouch for storing said tube in the compact stowed form; and g) means for automatically activating said switch when said tube is pulled out of said pouch.

31. An emergency supplementary vision device, comprising:

a) a collapsible tube made of airtight material and having an expanded form and a compact stowed form;

b) first and second clear members disposed at respective first and second ends of said tube to enable the user to see through said tube and observe a source of information at the other end while smoke or other particulate matter is in the environment;

c) a filter operably associated with said tube to filter the ambient atmosphere and fill the interior of said tube with clear air when said tube is expanded to its expanded form;

d) a source of light to aid the user to see the source of information;

e) a switch to control said source of light;

f) a pouch for storing said tube in the compact stowed form;

g) first and second switches disposed in series with said light source;

h) said first switch is in off state when inside said pouch and in an on state when outside said pouch; and i) said second switch is in an on state inside or outside said pouch.

32. An emergency supplementary vision device, comprising:

a) a collapsible tube made of airtight material and having an expanded form and a compact stowed form;

b) first and second clear members disposed at respective first and second ends of said tube to enable the user to see through said tube and observe a source of information at the other end while smoke or other particulate matter is in the environment; and c) a portion of said tube being made of filter material to filter the ambient atmosphere and fill the interior of said tube with clear air when said tube is expanded to its expanded form.

33. An emergency supplementary vision device, comprising:

a) a collapsible tube made of airtight material having an expanded form and a compact stowed form, said tube being adapted to be manually expanded or compacted;

b) first and second clear members disposed at respective first and second ends of said tube to enable the user to see through said tube and observe a source of information at the other end while smoke or other particulate matter is in the environment;

c) a filter operably associated with said tube to filter the ambient atmosphere and fill the interior of said tube with clear air when said tube is expanded to its expanded form;

d) a one-way valve operably disposed in series with said filter, said valve is normally open in one direction to allow air into said tube and normally closed in an opposite direction to maintain the air inside said tube; and e) said valve including a flap disposed across said filter within said tube.

* * * * *